US012504358B2

(12) United States Patent
Riba et al.

(10) Patent No.: US 12,504,358 B2
(45) Date of Patent: Dec. 23, 2025

(54) METHOD FOR AUTOMATICALLY EXAMINING A LIQUID SAMPLE

(71) Applicant: CYTENA GMBH, Freiburg (DE)

(72) Inventors: Julian Riba, Freiburg (DE); Matthias Müller, Freiburg (DE)

(73) Assignee: CYTENA GMBH, Freiburg (DE)

( * ) Notice: Subject to any disclaimer, the term of this patent is extended or adjusted under 35 U.S.C. 154(b) by 341 days.

(21) Appl. No.: 18/030,320

(22) PCT Filed: Oct. 5, 2021

(86) PCT No.: PCT/EP2021/077361
§ 371 (c)(1),
(2) Date: Apr. 5, 2023

(87) PCT Pub. No.: WO2022/073962
PCT Pub. Date: Apr. 14, 2022

(65) Prior Publication Data
US 2023/0366800 A1 Nov. 16, 2023

(30) Foreign Application Priority Data

Oct. 6, 2020 (LU) ........................ 102108

(51) Int. Cl.
G01N 15/06 (2024.01)
G01N 15/14 (2024.01)
(Continued)

(52) U.S. Cl.
CPC ......... *G01N 15/06* (2013.01); *G01N 15/1429* (2013.01); *G01N 15/1434* (2013.01);
(Continued)

(58) Field of Classification Search
CPC ... C12M 41/48; G01N 15/01; G01N 15/0227; G01N 15/06; G01N 15/075;
(Continued)

(56) References Cited

U.S. PATENT DOCUMENTS 6,133,995 A 10/2000 Kubota
2011/0127444 A1 6/2011 Ozasa et al.
2020/0264181 A1* 8/2020 Takahashi .......... G01N 15/1434

FOREIGN PATENT DOCUMENTS

DE 10304653 A1 8/2004
EP 3561040 A1 10/2019
(Continued)

OTHER PUBLICATIONS

Search Report and Written Opinion (With Cover Letter) for LU102108, provided by the Luxembourg Intellectual Property Office on Aug. 2, 2021.
(Continued)

*Primary Examiner* — Mark R Gaworecki
(74) *Attorney, Agent, or Firm* — Hodgson Russ LLP

(57) ABSTRACT

The invention relates to a method for automatically examining a liquid sample, which has a liquid and at least one particle, by means of a first measurement signal which emanates from a liquid region and which serves to determine at least one particle with a first property, and by means of a second measurement signal which emanates from the liquid region and serves to determine at least one particle with a second property, the first measurement signal and the second measurement signal being evaluated independently of one another and whether a particle condition has been satisfied in the liquid region subsequently being determined on the basis of the evaluated first measurement signal and the evaluated second measurement signal.

20 Claims, 6 Drawing Sheets

Figure 1:
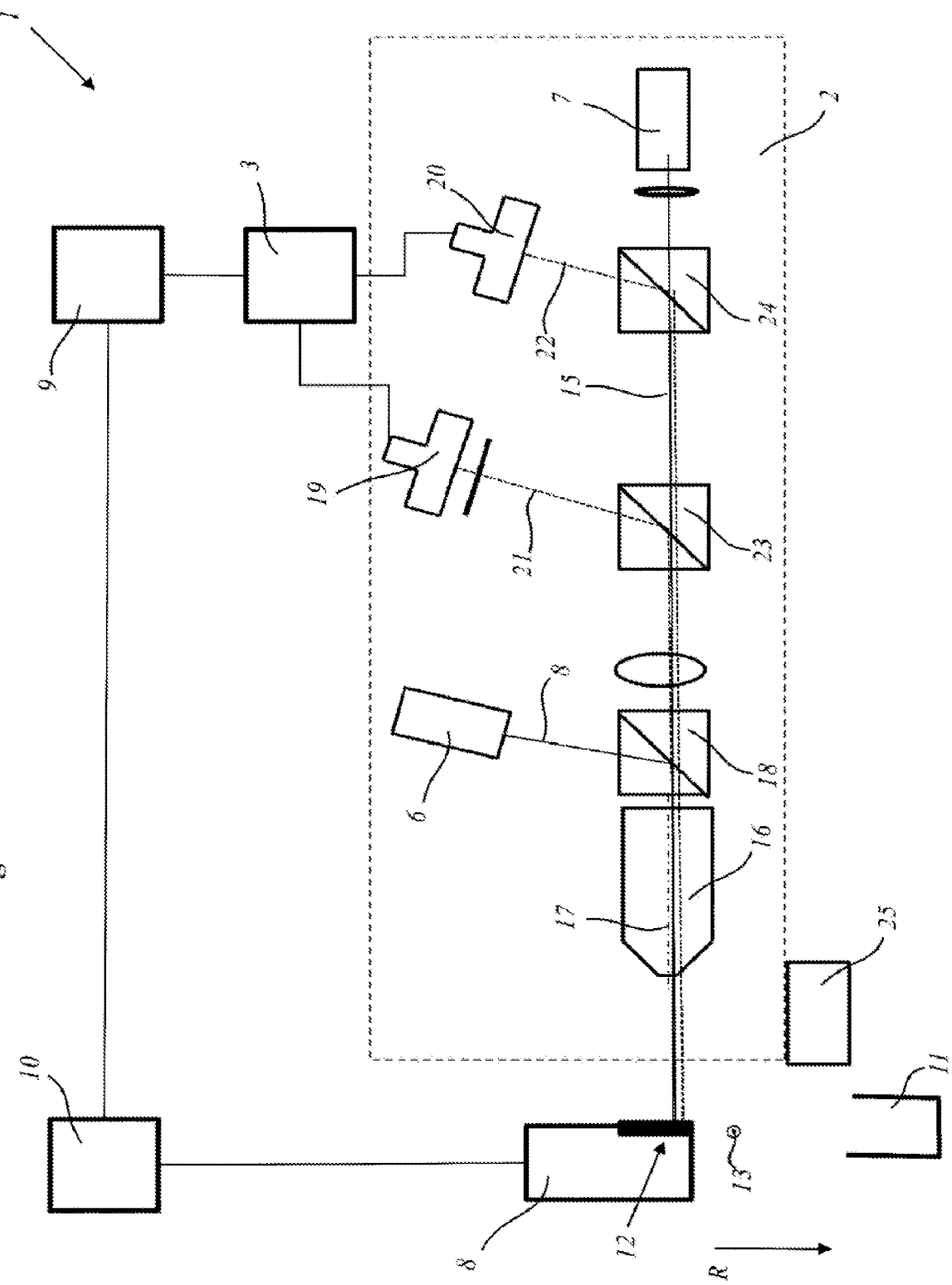

(51) Int. Cl.
*G01N 15/1429* (2024.01)
*G01N 15/1434* (2024.01)
*G01N 21/64* (2006.01)
*C12M 1/36* (2006.01)
*G01N 15/00* (2006.01)
*G01N 15/01* (2024.01)
*G01N 15/02* (2006.01)
*G01N 15/0227* (2024.01)
*G01N 15/075* (2024.01)
*G01N 15/10* (2006.01)
*G01N 15/1433* (2024.01)
*G01N 15/149* (2024.01)

(52) U.S. Cl.
CPC ........... *G01N 21/645* (2013.01); *C12M 41/48* (2013.01); *G01N 2015/0053* (2013.01); *G01N 15/01* (2024.01); *G01N 15/0227* (2013.01); *G01N 2015/0288* (2013.01); *G01N 2015/0294* (2013.01); *G01N 15/075* (2024.01); *G01N 2015/1006* (2013.01); *G01N 15/1433* (2024.01); *G01N 2015/1443* (2013.01); *G01N 15/149* (2024.01); *G01N 2015/1493* (2013.01); *G01N 2015/1497* (2013.01); *G01N 21/6408* (2013.01)

(58) Field of Classification Search
CPC ........... G01N 15/1429; G01N 15/1433; G01N 15/1434; G01N 15/149; G01N 21/6408; G01N 21/645; G01N 2015/0053; G01N 2015/0288; G01N 2015/0294; G01N 2015/1006; G01N 2015/1443; G01N 2015/1493; G01N 2015/1497
See application file for complete search history.

(56) References Cited

FOREIGN PATENT DOCUMENTS

WO WO2019/206476 A1 10/2019
WO WO2021/105380 A1 6/2021

OTHER PUBLICATIONS

Written Opinion of the International Searching Authority (ISA) for PCT Application PCT/EP2021/077361, provided by the European Patent Office on Jan. 26, 2022, with English translation.
Office Action from the German Patent and Trademark Office dated Jun. 27, 2024, regarding German Application 11 2021 005 316.7.

\* cited by examiner

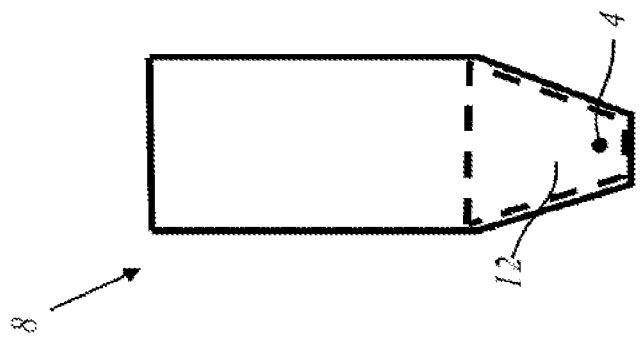
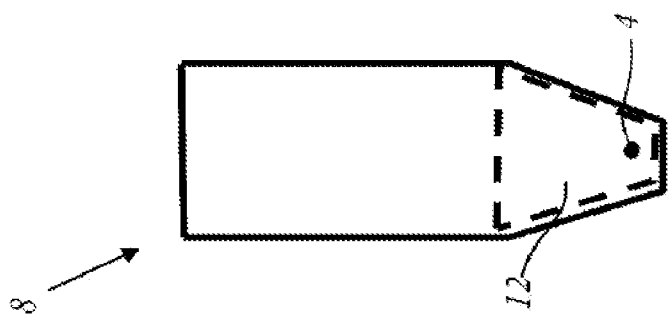

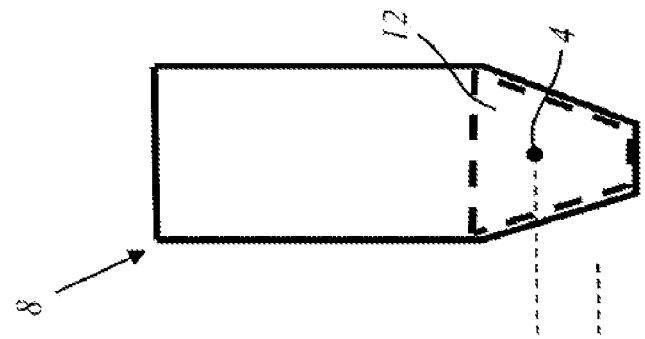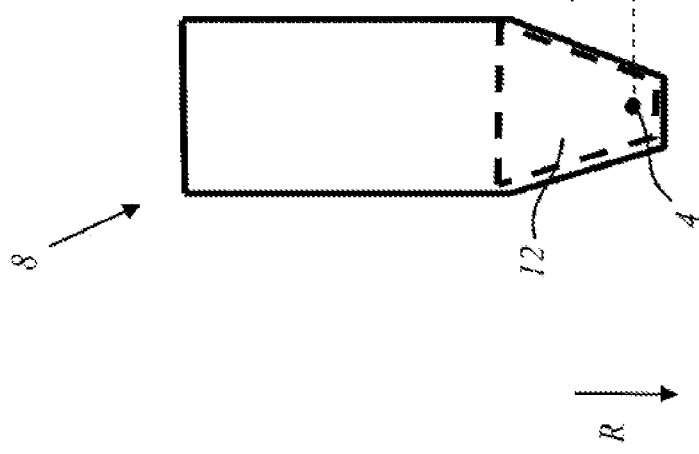

METHOD FOR AUTOMATICALLY EXAMINING A LIQUID SAMPLE

The invention relates to a method for automatically examining a liquid sample. In addition, the invention relates to a device for examining a liquid sample. The invention also relates to a computer program, by means of which the method is carried out, and a data medium on which the computer program is stored, and a data medium signal which transmits the computer program.

It is known from the prior art that active ingredients such as monoclonal antibodies and other proteins are produced with the aid what are termed of monoclonal cell lines. These are populations of cells all descended from a single mother cell. The production of monoclonal cell lines is necessary because this is the only way to ensure that all cells in the population have approximately the same genome in order to produce the active ingredients with a constant and reproducible quality.

To generate a monoclonal cell line, cells are individually transferred to wells of a microtiter plate. The cells to be transferred are produced by genetically modifying a host cell line and individualizing these modified cells. Individual cells are deposited in the microtiter plates using devices that are also referred to as dispensing devices.

On the part of the user, there is a need to be able to recognize different cells using the same device and/or using the same method. In particular, cells of different sizes should be recognized. This is against the background that space is limited in the laboratory and the number of laboratory devices should therefore be kept low.

The cells to be examined in the laboratory differ greatly in size. Small cells, such as bacteria, can be 50 times smaller than the cells mentioned above, which are used to produce the active ingredients. With known devices, however, small cells such as bacteria cannot be recognized or can only be recognized with difficulty. Accordingly, such cells cannot always be separated automatically and reliably. There is therefore a risk that several of these cells will be placed in the desired container by mistake, although the user would like to place exactly one cell. Furthermore, it can occur that a cell is placed in the target container that does not correspond to the target population because the device does not allow the cells to be classified reliably.

The object of the invention is to specify a method by means of which the disadvantages mentioned above can be reduced or avoided.

The object is achieved by a method for automatically examining a liquid sample using a first measurement signal, which emanates from a liquid region and serves to determine at least one particle with a first property, and a second measurement signal, which emanates from the liquid region and serves to determine at least one particle with a second property, wherein the first measurement signal and the second measurement signal are evaluated independently of one another and whether a particle condition has been satisfied in the liquid region is subsequently determined on the basis of the evaluated first measurement signal and the evaluated second measurement signal.

In addition, the object of the invention is to specify a device by means of which the disadvantages mentioned above can be reduced or avoided.

The object is achieved by a device for examining a liquid sample, which has a liquid and at least one particle, with a detection device for detecting a first measurement signal emanating from a liquid region, by means of which at least one particle with a first property can be determined, and for detecting a second measurement signal emanating from the liquid region, by means of which at least one particle with a second property can be determined, and an evaluation device, which evaluates the first measurement signal and the second measurement signal independently of one another and, based on the evaluated first measurement signal and the evaluated second measurement signal, determines whether a particle condition is satisfied in the liquid region.

According to the invention, it has been recognized that small particles, such as bacteria, can be recognized more easily if at least two measurement signals are evaluated, wherein the first measurement signal provides at least one piece of information about a first property of the particle and the second measurement signal provides at least one piece of information about a second property of the particle contains particles. The first property differs from the second property. As a result, the method according to the invention and the device according to the invention can reduce the risk of small particles, in particular bacteria, not being recognized and therefore not being isolated.

The term "particles" is to be understood as a generic term that comprises both solid organic or inorganic microparticles and biological cells. The liquid sample comprises a liquid and at least one particle. The liquid can be a cell suspension that can promote a growth of the cells arranged in the liquid. The particle can be a glass or polymer bead and have substantially the same volume as a cell. The liquid sample can have at least one cell and/or a glass or polymer bead in addition to the liquid.

The property of the particle can be a physical and/or optical property of the particle. For example, the property of the particle that can be determined using the measurement signal can be the morphology and/or granularity and/or transparency and/or color, in particular fluorescent color, of the particle and/or the intensity of the emitted light, in particular fluorescent light, of the particle.

An advantageous embodiment is realized when the first measurement signal contains information about the morphology and/or granularity and/or transparency and/or size of the particle and the second measurement signal contains information about the color, in particular the fluorescent color, of the particle and/or the intensity of the particle contains light emitted by the particle. It is known that particles are labeled with fluorescent dyes in order to be able to determine particles with different properties, such as different sizes. However, not all particles fluoresce equally, so that weakly fluorescent particles sometimes cannot be detected. According to the invention, this is avoided in that the first and second measurement signals are taken into account when checking the particle condition.

The liquid region is a region of the liquid sample from which the first and second measurement signals emanate. The liquid region can have no particles or at least one particle. In this case, the liquid region corresponds to a region that is viewed, in particular optically, by the detection device.

The automatic examination of the liquid means that the method steps are not carried out manually by a laboratory worker, for example. The evaluation device can have an electrical computer unit, by means of which the measurement signals are evaluated.

As explained in more detail below, the same particle or particles that are different from one another can be determined using the first measurement signal and the second measurement signal.

The evaluation of the first measurement signal and the second measurement signal independently of one another means that both measurement signals are evaluated in a first step. In this respect, the evaluation of a measurement signal does not depend on the evaluation of the other measurement signal, as is the case in the known methods. In the method according to the invention, both measurement signals are always evaluated. In a second step, based on the evaluated measurement signals, it is determined whether the particle condition is satisfied.

In a special embodiment, the evaluation device can evaluate the first measurement signal to determine whether a particle is arranged in the liquid region. For this purpose, the first measurement signal is evaluated to determine whether a particle with the first property is arranged in the liquid region. In particular, the evaluation device can use the first measurement signal to determine the number of particles in the liquid region.

In addition, the evaluation device can evaluate the second measurement signal to determine whether a particle is arranged in the liquid region. For this purpose, the first measurement signal is evaluated to determine whether a particle with the second property is arranged in the liquid region. In particular, the evaluation device can use the second measurement signal to determine the number of particles in the liquid region.

In addition, the evaluation device can determine a location of the particle determined using the first measurement signal and/or a location of the particle determined using the second measurement signal in the liquid region, in particular relative to a wall, such as a wall of a dispenser. The location of the particle in the liquid region is understood as the position. A Cartesian coordinate system can be used to characterize the location, wherein the location of the particle is determined in at least one, in particular exactly two or exactly three, coordinate axes.

In a special embodiment, the first measurement signal can be an optical signal. In particular, the first measurement signal can be bright-field light or dark-field light or fluorescent light emanating from the liquid region. The second measurement signal can be an optical signal. In particular, the second measurement signal can be a fluorescent light emanating from the liquid region. The first measurement signal can result from a first optical measurement method that differs from a second optical measurement method from which the second measurement signal results. The respective optical measuring method can be a bright-field method, a dark-field method, a phase contrast method, a confocal method or a Raman spectroscopy method.

For determining whether at least one particle is arranged in the liquid region, the evaluation device can evaluate the first measurement signal to determine whether a particle with an optical and/or physical first property is arranged in the liquid region. If this is the case, at least one particle is arranged in the liquid region. In addition, for determining whether at least one particle is arranged in the liquid region, the evaluation device can evaluate the second measurement signal to determine whether a particle with an optical and/or physical second property is arranged in the liquid region. If this is the case, at least one particle is arranged in the liquid region. As already described above, the first property of the particle differs from the second property of the particle.

The detection device can have a first imaging device which, based on the first measurement signal, generates a first image, in particular a bright-field image or dark-field image or fluorescence image, and the evaluation device can examine the first image to determine whether at least one particle is arranged in the liquid region to the effect that whether a particle with an optical and/or physical first property is arranged in the liquid region.

In addition, the detection device can have a second imaging device, which generates a second image, in particular a fluorescence image, based on the second measurement signal, and the evaluation device can, in order to determine whether at least one particle is arranged in the liquid region, examine the second image to determine whether in a particle with an optical and/or physical second property is arranged in the liquid region.

Alternatively, it is possible for the detection device to have a single imaging device, which generates a first image based on the first measurement signal and/or generates a second image based on the second measurement signal. As described above, the first and second images can each be examined to determine whether a particle with an optical and/or physical property is arranged in the liquid region.

The bright-field light can be used to generate a bright-field image. The dark-field light can be used to generate a dark-field image and the fluorescent light can be used to generate a fluorescent image. Generating at least one image offers the advantage that the particle and/or the location of the particle in the liquid region can be shown to the user by means of a display device. In addition, generating at least one image has the advantage that the location of the specific particle can be determined in a simple manner.

The location of the particle determined using the first measurement signal and/or the location of the particle determined using the second measurement signal can be determined using an object recognition algorithm. It is particularly advantageous if the object recognition algorithm is applied to the generated images. In particular, the location of the particle can be determined based on a determined centroid of the particle determined using the first measurement signal and/or the particle determined using the second measurement signal.

The device can have a first light source for emitting a first illuminating light, wherein the liquid region is illuminated with the first illuminating light and the first measurement signal then emanates from the liquid region. In addition, the device can have a second light source for emitting a second illuminating light, wherein the liquid region is illuminated with the second illuminating light and the second measurement signal then emanates from the liquid region.

The liquid region can be simultaneously illuminated by the first illuminating light and the second illuminating light. In particular, the liquid region can start to be illuminated with the first illuminating light and the second illuminating light at the same point in time.

In addition, the liquid region can be illuminated several times with the first illuminating light and/or the second illuminating light. The number of illuminating processes can be specified. Alternatively or additionally, the period of time in which the liquid region is repeatedly illuminated with the first illuminating light and/or the second illuminating light can be specified.

The first and second measurement signal can be detected simultaneously. In particular, it is possible to start detecting the first and the second measurement signal at the same point in time. In addition, the first and second measurement signals can be detected several times in succession. In this case, all of the measurement signals detected can be used to determine whether the particle condition is satisfied.

In a particularly advantageous embodiment, the first imaging device can generate a bright-field image based on the first measurement signal and the second imaging device can generate a fluorescence image based on the second measurement signal. Alternatively or additionally, the first imaging device can generate a fluorescence image for imaging a particle marked with a fluorescent dye based on the first measurement signal, and the second imaging device can generate another fluorescence image generated for imaging of a particle which is marked with another fluorescent dye based on the second measurement signal. Alternatively, it is possible for the images mentioned above to be generated with a single imaging device.

The processes that often occur in laboratories can be improved by means of the method and the device according to the invention.

It is known that particles, in particular cells, are stained in order to be able to detect them independently of the particle size by means of fluorescence. A fluorescent dye is used, which stains all particles, in particular cells, within a sample. In practice, however, the fluorescence intensity varies, so that not all particles, in particular cells, are equally bright and therefore not all cells can be reliably detected. Here, the inventive consideration of the first measurement signal and the second measurement signal, in particular the bright-field light and the fluorescent light, results in the detection efficiency increasing.

In addition, a sub-population can be stained in a mixed sample in a different procedure in the laboratory. As already described in the introduction, small particles, in particular bacteria, cannot be determined when the first measurement signal is bright-field light, for example. According to the invention, it has been recognized that small particles, in particular bacteria, can also be determined by using the first and second measurement signals. This increases throughput and fewer particles are discarded when the device is used to dispense the liquid sample.

In addition, in the laboratory in biological experiments, multiple fluorescent dyes can be used to either tag multiple subpopulations or to tag a very specific subpopulation using multiple markers. Since images are generated in the method and device according to the invention, a location of the determined particles can be determined in a simple manner. As is described in more detail below, this makes it possible to determine whether the detected particles are the same particles. As a result, particles marked by several fluorescent dyes can be detected more reliably.

As described above, two fluorescence images can be used in the method. However, it is also possible to use bright-field imaging in addition to the two fluorescence images. Alternatively, bright-field imaging and fluorescence imaging can be used.

In a particular embodiment, when determining whether the particle condition is satisfied, the evaluation device can check whether the particle determined using the first measurement signal and the particle determined using the second measurement signal are the same particle.

Such a determination can be made particularly easily when the evaluation device determines that the particles determined using the measurement signals are the same particle when the location of the particle determined using the first measurement signal corresponds to the location of the particle determined using the second measurement signal. The evaluation device can thus use the determined location of the particles to recognize whether it is the same particle. For this purpose, the evaluation device can determine whether the coordinates of the particles match in at least two, in particular three, directions in space. The location can be determined based on the images generated by the first and second imaging devices.

Alternatively or additionally, the evaluation device can determine that the particle determined using the measurement signals is the same particle when a distance between the particle determined using the first measurement signal and the particle determined using the second measurement signal is smaller or larger than a predefined limit value. In particular, it can be checked whether the location of the particle determined by means of the first measurement signal deviates from the location of the particle determined by means of the second measurement signal by a maximum of a predefined limit value. Taking the limit value into account has the advantage that it cannot always be ensured that the first measurement signal and the second measurement signal are recorded at the same time. In this respect, the limit value can depend on a time difference between a detection of the first measurement signal and the second measurement signal. The limit value thus takes into account that the particle moves during the time difference, for example due to sedimentation, and thus the location of the particle determined using the first measurement signal no longer has to match the location of the particle determined using the second measurement signal. Alternatively or additionally, the limit value can depend on the size of the particle determined using the first measurement signal and/or the particle determined using the second measurement signal.

The limit value can be set to correspond to a distance between two particles of 1-100 µm (micrometers), preferably 2-10 µm. Instead of a static limit value, an adaptive limit value can also be used. As described above, such an adaptive limit value can depend on a time difference between a detection of the first measurement signal and the second measurement signal and/or also on the size of the particles to be examined.

The evaluation device can determine that the particle condition is satisfied when the ascertained number of particles located in the liquid region corresponds to a predetermined number of particles. The predetermined number can have the value 0, so that no particles are arranged in the liquid region. Alternatively, the predetermined number can have a value greater than 0, in particular exactly 1. The predetermined number can be set by the user or automatically, in particular before the method is carried out.

In the following, states in the liquid region are described in which the particle condition is satisfied. It is sufficient for the particle condition to be satisfied if only one of the states described is present.

The particle condition can be satisfied when the number of particles determined by means of the first measurement signal corresponds to a predetermined number of particles, and no particles that can be determined by means of the second measurement signal are arranged in the liquid region. This case can occur when the particles are large, for example, so that they can be determined using the first measurement signal, but have no fluorescence property, so that they cannot be determined using the second measurement signal.

Alternatively, the particle condition can be satisfied when no particles that can be determined using the first measurement signal are arranged in the liquid region and the number of particles determined using the second measurement signal corresponds to a predetermined number of particles. This case can occur when the particles are small and fluoresce, for example. The predetermined number of particles can have the value 1 in both cases.

In addition, the particle condition can be satisfied when one or more particles that can be determined using the first measurement signal are arranged in the liquid region and the number of particles determined using the second measurement signal corresponds to a predetermined number of particles. This case can occur when the target particles are cells marked with a fluorescent dye, while inorganic particles are detected by means of the first measurement signal, but can be ignored when determining the particle condition, since their presence in the target container does not have a disruptive effect on the further course of the process. The specified number of target particles, in particular fluorescent particles, can have the value 1.

In addition, the particle condition can be satisfied when the number of particles determined using the first measurement signal and the number of particles determined using the second measurement signal each correspond to a specified number of particles and when it is determined that the at least one particle determined by means of the first measurement signal and the at least one particle determined by means of the second measurement signal are the same particle. This case can occur when the particle is still large enough for it to be able to be determined using the first measurement signal and fluoresces so that it can be determined using the second measurement signal.

It can be determined in the manner described above whether the particles determined by means of the measurement signals are the same particle. The specified number of particles can have the value 1.

In a particular embodiment, the device can have a dispenser for dispensing a liquid sample. The liquid sample, in particular the liquid region, can be arranged in the dispenser. A portion of the liquid sample contained in the dispenser can be dispensed by means of the dispenser during each dispensing process.

The device can have a control device that controls a dispensing process depending on whether the particle condition is satisfied. In particular, during the dispensing process, a deposit location of the cell and/or the particle, the number of liquid drops to be dispensed, the dispensing time and the dispensing volume can be controlled based on the first and/or second measurement signal. The deposit location and/or the number of liquid drops to be dispensed and/or the dispensing time and/or the dispensing volume can depend on whether the particle condition is satisfied.

The liquid sample dispensed by means of the device can be a drop, in particular a free-flying drop. The liquid droplet may have a volume ranging from 1 pL (picoliter) to 1 μL (microliter). The sample output can be carried out according to a drop-on-demand operating mode. In this case, the device dispenses samples discretely and not continuously. In order to implement the drop-on-demand mode of operation, the device can have an actuating means, which can be a piezoelectrically operated actuator, for example. The device can have a section, in particular a mechanical membrane, which can be actuated by the actuating means. When the actuating means is actuated, the liquid sample, in particular a drop, is ejected from the dispenser.

The liquid sample dispensed from the device may comprise liquid and not a particle. Alternatively, the liquid sample dispensed may have liquid and a single particle. In addition, the liquid sample dispensed may have liquid and more than a single particle.

The device can have a moving device for moving the dispenser and/or a carrier for receiving the dispensed liquid sample, wherein the control device controls the moving device and/or the carrier.

The carrier can be a container bottom onto which the liquid sample is applied. The container can be part of a microtiter plate that has a large number of containers. Alternatively, the support can be a flat plate onto which the liquid sample is applied. Equally, the carrier can be a bottom of a container onto which the liquid sample is applied. The liquid sample placed on the carrier can be processed in other investigations. Alternatively, the carrier can be a reject carrier if the deposited liquid sample is not to be processed any further.

The device can have a deflection device for deflecting a liquid sample dispensed from the dispenser and/or a catching device for catching a liquid sample dispensed from the dispenser.

After being ejected, the liquid sample can be deflected in the direction of the carrier by the deflection device. Such a deflection can be achieved, for example, by an air flow or an electric field. The catching device can be designed in such a way that it moves the reject carrier into the trajectory of the ejected liquid in order to receive the liquid sample and also moves it out of the trajectory again.

Of particular advantage is a device that has means by which a method according to the invention can be carried out. In addition, a computer program is of particular advantage which comprises instructions which, when the program is executed by a computer, cause the latter to carry out the method according to the invention. A data carrier on which the computer program according to the invention is stored is also advantageous. In addition, a data carrier signal is advantageous which transmits a computer program according to the invention.

Figure 2:
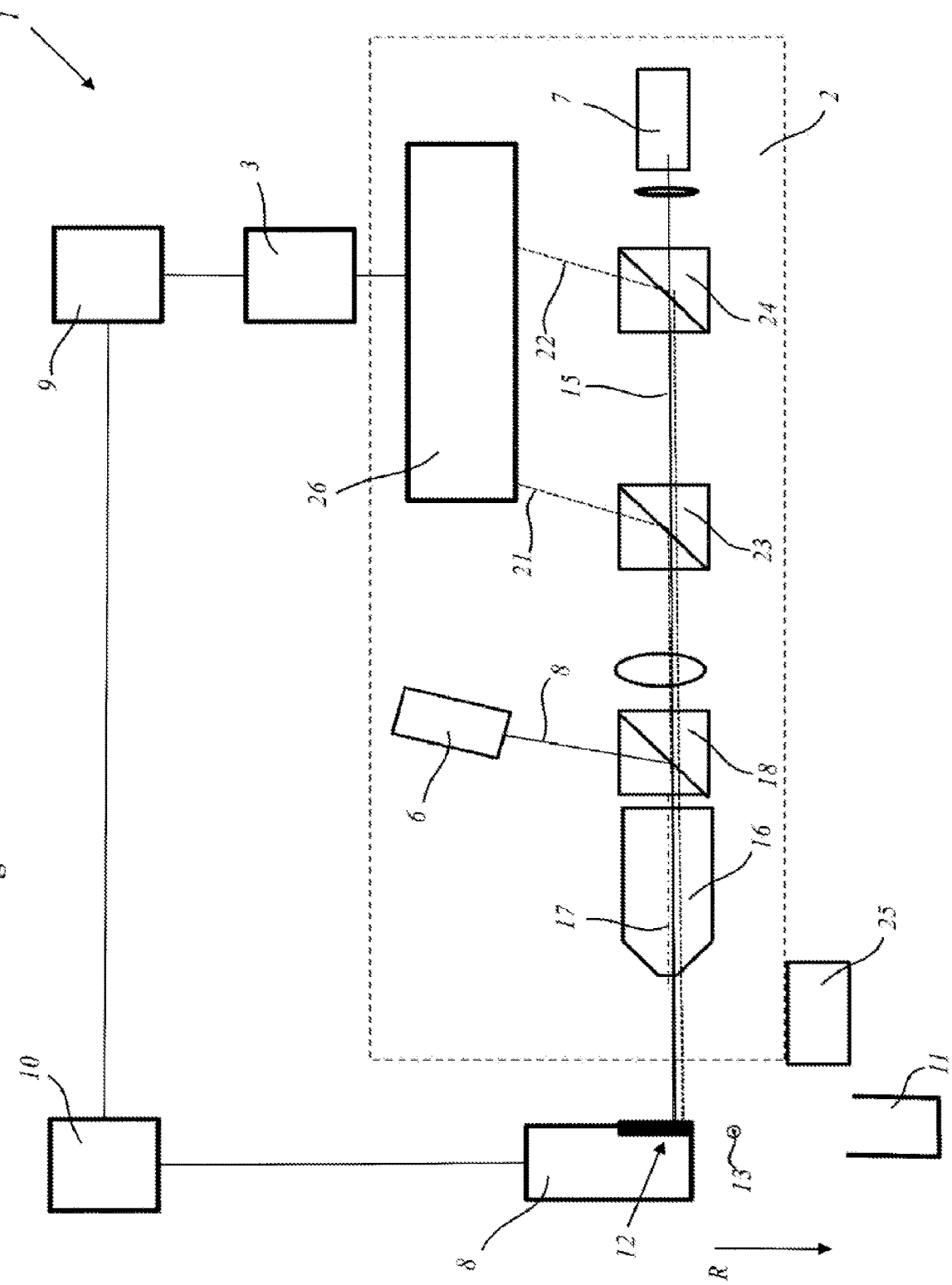
Figure 3B:
Figure 3A:
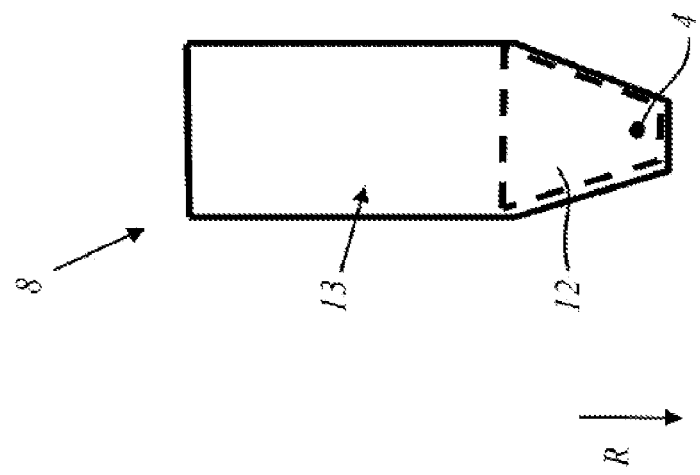
Figure 4B:
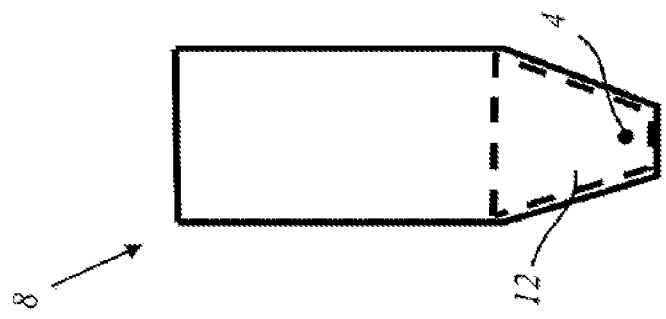
Figure 4A:
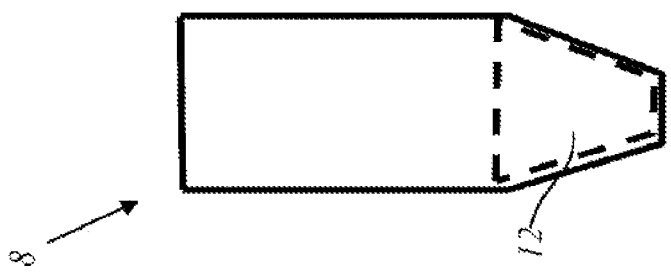

The subject matter of the invention is shown schematically in the figures, wherein elements that are the same or have the same effect are usually provided with the same reference symbols. In the figures:

FIG. 1 shows a schematic representation of a device according to a first embodiment of the invention, FIG. 2 shows a schematic representation of a device according to a second embodiment of the invention, FIG. 3a shows a view of a dispenser of the device shown in FIG. 1, in a first state in which a first measurement signal emanates from the liquid region, FIG. 3b shows a view of a dispenser of the device shown in FIG. 1, in the first state in which a second measurement signal emanates from the liquid region, FIG. 4a shows a view of a dispenser of the device shown in FIG. 1 in a second state in which a first measurement signal emanates from the liquid region, FIG. 4b shows a view of a dispenser of the device shown in FIG. 1, in the second state, in which a second measurement signal emanates from the liquid region, FIG. 5a shows a view of a dispenser of the device shown in FIG. 1, in a third state in which a first measurement signal emanates from the liquid region, FIG. 5b shows a view of a dispenser of the device shown in FIG. 1, in the third state, in which a second measurement signal emanates from the liquid region, FIG. 6a shows a view of a dispenser of the device shown in FIG. 1 in a fourth state, in which a first measurement signal emanates from the liquid region, FIG. 6b shows a view of a dispenser of the device shown in FIG. 1 in the fourth state, in which a second measurement signal emanates from the liquid region.

FIG. 1 shows a device 1 for examining a liquid sample 13. The device 1 has a detection device 2 for detecting a first measurement signal 21 emanating from a liquid region 12, by means of which it can be determined whether at least one particle 4 with a first property is arranged in the liquid region 12. In addition, the detection device 2 serves to detect a second measurement signal 22 emanating from a liquid region 12, by means of which it can be determined whether at least one particle 4 with a second property is arranged in the liquid region 12.

The device 1 also has an evaluation device 3, which evaluates the first measurement signal 21 and the second measurement signal 22 independently of one another and, determines whether a particle condition is satisfied in the liquid region 12 on the basis of the evaluated first measurement signal 21 and the evaluated second measurement signal 22. The evaluation device 3 is electrically connected to the detection device 2. In particular, the first and second measurement signal 21, 22 determined using the detection device 2 can be transmitted to the evaluation device 3. The evaluation device 3 can be part of a computer, not shown.

The device 1 also has a dispenser 8 for dispensing a liquid sample 13. The liquid sample 13 dispensed may contain a liquid alone or a liquid containing at least one particle 4. The dispenser 8 can be a drop generator which, as shown in FIG. 1, dispenses the liquid sample 13 in the form of a drop. The dispenser 8 has a liquid reservoir, not shown in detail in FIG. 1, for receiving the liquid sample 13.

A state is shown in FIG. 1 in which the dispenser 8 has dispensed a liquid sample 13. The liquid sample 13 is fed into a container of a carrier 11. In order to dispense the liquid sample 13, the dispenser 8 is actuated by an actuator, not shown, in particular a piezo actuator.

In addition, the device 1 has a plurality of imaging devices, namely a first imaging device 19 and a second imaging device 20. The first imaging device 19 can generate a first image based on the first measurement signal 21. The second imaging device 20 can generate a second image based on the second measurement signal 22. The first and second imaging devices 19, 20 can each be a camera.

The detection device 2 is an optical detection device and serves for the optical detection of the liquid region 12 arranged in the dispenser 8. The detection device 2 has a first light source 6, such as an LED lamp, for emitting a first illuminating light 8. In addition, the detection device 2 has a second light source 7, such as a laser, for emitting a second illuminating light 15.

The detection device 2 also has a lens 16. The lens 16 is arranged in such a way that an optical axis 17 of the lens 16 runs perpendicularly to an output direction R of the liquid sample 13 from the dispenser 8. In addition, the detection device 2 has a first filter 18 which is arranged in the beam path of the first illuminating light 8 between the lens 16 and the first light source 6.

The first filter 18 is designed in such a way that it deflects the first illuminating light 8 in the direction of the lens 16. In addition, the first filter 18 is designed in such a way that it lets through a first measurement signal 21 emanating from the liquid region 12, which results from the first illuminating light 8 and is shown in broken lines in FIG. 1. The first measurement signal 21 can be a bright-field light.

The electrical measurement signal 21 let through by the first filter 18 is deflected by a second filter 23 in the direction of the first imaging device 19. The first imaging device 19 can be a camera. The first measurement signal 21 and the first illuminating light 8 partially have a common beam path.

The first imaging device 19 can generate an image of the liquid region 12 based on the detected first measurement signal 21. The image generated and/or the information contained in the first measurement signal 21 are transmitted to the evaluation device 3.

The second light source 7 can emit the second illuminating light 15 for illuminating the liquid region 12 of the dispenser 8. The second illuminating light 15 is passed through a beam deflector 24 of the device 1, the second filter 23 and the first filter 18 to the lens 16. In this case, the second illuminating light 15 and the first illuminating light 14 have a common beam path. In particular, both the first illuminating light 14 and the second illuminating light 15 are passed through the lens 16 to the liquid region 12.

The second measurement signal 22 emanating from the liquid region 12 as a result of the second illuminating light 15 is received by the second imaging device 20. For this purpose, the beam deflector 24 deflects the second measurement signal 22 emanating from the liquid region 12, which is shown in broken lines, in the direction of the second imaging device 20. The second measurement signal 22 can be fluorescent light emitted by a particle 4 if a particle 4 with fluorescent properties is arranged in the liquid region 12 of the dispenser 8. The second illuminating light 15 and the second measurement signal 22 partially have a common beam path.

The evaluation device 3 is connected to a control device 9. The control device 9 controls the dispensing process of the dispenser 8 based on the evaluation result of the evaluation device 17. In particular, the control device 9 controls the dispenser 8 depending on whether the particle condition is satisfied.

The control device 9 is electrically connected to a moving device 10. The moving device 10 can move the dispenser 2 and/or the carrier 11 in such a way that the liquid sample 13 can be delivered to the desired deposit location.

In addition, the control device 9 can control a deflection and/or catching device 25 of the device 1. The control device 9 can control the deflection and/or catching device 25 in such a way that the dispensed liquid sample 13 is deflected and/or caught before it reaches the carrier 11 when the particle condition is not satisfied.

FIG. 1 shows a state in which the liquid region 12 is illuminated both by the first illuminating light 14 and by the second illuminating light 15. Accordingly, both the first measurement signal 21 and the second measurement signal 22 emanate from the liquid region 12. The first and second measurement signal 21, 22 are received by the respectively assigned first and second imaging device 19, 20 and transmitted to the evaluation device 3. In addition, the first and second imaging devices 19, 20 transmit a first image generated based on the first measurement signal 21 and a second image generated based on the second measurement signal 22 to the evaluation device 3.

The evaluation device 3 evaluates the first and second measurement signal 21, 22 independently of one another. Thus, the first measurement signal 21 is always evaluated, regardless of the result of the evaluation of the second measurement signal 22. Likewise, the second measurement signal 22 is always evaluated, regardless of the result of the evaluation of the first measurement signal 21.

Based on the first and second measurement signal 21, 22, the evaluation device 3 then determines whether the particle condition is satisfied and transmits the evaluation result to the control device 9. The evaluation device 3 checks whether the determined number of particles arranged in the liquid region 12 corresponds to a predetermined number of particles. The predetermined number of particles can have the value 1. In other words, the particle condition can be satisfied when a single particle 4 is arranged in the liquid region.

FIG. 2 shows a schematic representation of a device according to a second embodiment of the invention. The device differs from the device illustrated in FIG. 1 in that there is a single imaging device 26. The first and second measurement signals 21, 22 are fed to the imaging device 26, which generates a first image based on the first measurement signal 21 and a second image based on the second measurement signal 22.

Various states are shown in FIGS. 3-6 which can occur in the dispenser 8 and which influence whether the particle condition is satisfied or not. FIGS. 3-6 show a view of the dispenser 8 as it is detected by the detection device 2.

FIG. 3a shows a view of the dispenser 8 in a first state in which the first measurement signal 21 emanates from the liquid region 12. In this respect, FIG. 3a shows a state as it is determined by the first imaging device 19 and/or is imaged in the first image of the first imaging device. FIG. 3b shows a view of the dispenser 8 in a first state in which the second measurement signal 22 emanates from the liquid region 12. In this respect, FIG. 3b shows a state as it is determined by the second imaging device 20 and/or is imaged in the second image of the second imaging device.

As previously described, the dispenser 8 has a liquid region 12 which is monitored by the detection device 2. The liquid region 12 comprises a dispensing opening through which the liquid sample 13 is dispensed. The part of the liquid sample 14 contained in the liquid region 12 can be ejected during each dispensing process in the dispensing direction R. The liquid region 12 under consideration corresponds to only part of the dispenser 8 and is shown in dashed lines in FIGS. 2a and 2b.

In the state shown in FIGS. 3a and 3b, it can be determined by means of the first measurement signal 21 that a particle 4 with a first property is arranged in the liquid region 12. The first property can be an optical and/or physical property. Thus, the first property can relate to the morphology of a particle. It can be determined by means of the second measurement signal 22 that no particles are arranged in the liquid region. The second property can be whether the particle fluoresces.

The evaluation device 3 checks, in particular, whether the number of particles determined on the basis of the first measurement signal 21 and the second measurement signal 22 corresponds to a predefined number of particles. In the present case, a single particle 4 was determined, so that the evaluation device 3 determines that the liquid region 12 contains only a single particle.

The default number of particles is assumed to be 1. Therefore, in this case, the particle condition is satisfied. The control device 9 will thus control the moving device 10 in such a way that the liquid sample 13 is dispensed into the carrier 11.

FIG. 4a shows a view of the dispenser 8 in a second state in which the first measurement signal 21 emanates from the liquid region 12. Fig. In this respect, FIG. 4a shows a state as it is determined by the first imaging device 19 and/or is imaged in the first image of the first imaging device 19. FIG. 4b shows a view of the dispenser 8 in a first state in which the second measurement signal 22 emanates from the liquid region 12. In this respect, FIG. 4b shows a state as it is determined by the second imaging device 20 and/or is imaged in the second image of the second imaging device 20.

The second state differs from the first state shown in FIGS. 3a and 3b in that it is determined by means of the first measurement signal 21 that no particles 4 are arranged in the liquid region 12. However, it is determined by means of the second measurement signal 22 that a single particle 4 is arranged in the liquid region 12.

Based on the first measurement signal 21 and the second measurement signal 22, the evaluation device 3 determines that only a single particle 4 is arranged in the liquid region 12, so that the particle condition is satisfied. This is communicated to the control device 9, which carries out the same steps as in the first state described above.

FIG. 5a shows a view of the dispenser 8 in a third state in which the first measurement signal 21 emanates from the liquid region 12. In this respect, FIG. 5a shows a state as it is determined by the first imaging device 19 and/or is imaged in the first image of the first imaging device. FIG. 5b shows a view of the dispenser 8 in a first state in which the second measurement signal 22 emanates from the liquid region 12. In this respect, FIG. 5b shows a state as it is determined by the second imaging device 20 and/or is imaged in the second image of the second imaging device.

The third state differs from the first and second states described above in that it is determined by means of the first measurement signal 21 that a particle 4 is arranged in the liquid region 12 and in that it is also determined by means of the second measurement signal 22 that a particle 4 is arranged in the liquid region 12.

The evaluation device 3 checks whether the particles determined with the first and second measurement signal 21, 22 are the same particle. For this purpose, the location of the particles 4 in the liquid region 12 is determined in each case. The location can be determined using the first image generated by the first imaging device 19 and the second image generated by the second imaging device 20. In particular, based on the generated first and second images, it is checked whether the location of the particles determined by means of the first measurement signal 21 and the second measurement signal deviate from one another. The evaluation device 3 determines the location of the determined particles 4 in two or three spatial directions. Each of the spatial directions is checked to see whether a distance between the specific particles is smaller or larger than a predetermined limit value.

This is the case in the third state, so that the evaluation device 3 determines that the particle condition is satisfied. The result of the evaluation device 3 is transmitted to the control device 9, which carries out the same steps as in the first state described above.

FIG. 6a shows a view of the dispenser 8 in a fourth state, in which the first measurement signal 21 emanates from the liquid region 12. In this respect, FIG. 6a shows a state as it is determined by the first imaging device 19 and/or is imaged in the first image of the first imaging device 19. FIG. 6b shows a view of the dispenser 8 in a first state in which the second measurement signal 22 emanates from the liquid region 12. In this respect, FIG. 6b shows a state as it is determined by the second imaging device 20 and/or is imaged in the second image of the second imaging device.

In the fourth state, analogously to the third state, it is determined by means of the first measurement signal 21 and the second measurement signal 22 that a particle 4 is in the liquid region 12. However, the fourth state is different from the third state in that the locations of the specific particles 4 are different from one another. In particular, the particle 4 determined by means of the first measurement signal 21 is offset in the output direction R by the distance d from the particle 4 determined by means of the second measurement signal 22. The location of the two particles 4 can be determined as described above.

In the present case, the evaluation device 3 determines that the distance d between the two particles 4 exceeds a limit value, so that the particle condition is not satisfied. The evaluation result is transmitted to the control device 9.

The control device 9 controls the deflection and/or catching device 25 in such a way that the liquid sample 13 that is dispensed is caught before it enters the carrier 11.

LIST OF REFERENCE SYMBOLS

1 Device
2 Detection device
3 Evaluation device
4 Particle
6 First light source
7 Second light source
8 Dispenser
9 Control device
Moving device
11 Carrier
12 Liquid region
13 Liquid sample
14 First illuminating light
Second illuminating light
16 Lens
17 Optical axis
18 First filter
19 First imaging device
Second imaging device
21 First measurement signal
22 Second measurement signal
23 Second filter
24 Beam deflector
Deflection and/or interception device
26 Imaging device
R Output direction

The invention claimed is:

1. A device for examining a liquid sample including a liquid and at least one particle, the device comprising:
   a detection device that detects a first measurement signal emanating from a liquid region of the liquid sample, by means of which at least one particle having a first property can be determined, and that detects a second measurement signal emanating from the liquid region, by means of which at least one particle having a second property can be determined;
   an evaluation device which evaluates the first measurement signal and the second measurement signal independently of one another and determines whether a particle condition is satisfied in the liquid region based on the evaluated first measurement signal and the evaluated second measurement signal;
   a dispenser for dispensing the liquid sample;
   an actuating means for actuating the dispenser to eject a drop of the liquid sample from the dispenser; and
   a control device which controls a dispensing process depending on whether the particle condition is satisfied and determines a deposit location for the drop of the liquid sample to be dispensed, wherein the deposit location depends on whether the particle condition is satisfied.

2. The device according to claim 1, wherein the evaluation device evaluates the first measurement signal and/or the second measurement signal to determine whether a particle is arranged in the liquid region.

3. The device according to claim 1, wherein the evaluation device evaluates the first measurement signal and/or the second measurement signal to determine the number of particles located in the liquid region.

4. The device according to claim 1, wherein the evaluation device determines a location of the particle in the liquid region based on the first measurement signal and/or the second measurement signal.

5. The device according to claim 1, wherein
   a) the evaluation device evaluates the first measurement signal to determine whether a particle with an optical and/or physical first property is arranged in the liquid region; and/or
   b) the evaluation device evaluates the second measurement signal to determine whether a particle with an optical and/or physical second property is arranged in the liquid region.

6. The device according to claim 1, wherein:
   a) the detection device has at least one imaging device which generates a first image based on the first measurement signal and/or which generates a second image based on the second measurement signal; and
   b) the evaluation device determines an optical or physical first property of the particle based on the first image, and/or an optical or physical second property of the particle based on the second image.

7. The device according to claim 1, wherein:
   a) the device has a first light source for emitting a first illuminating light, the liquid region being illuminated with the first illuminating light and the first measurement signal subsequently emanating from the liquid region; and/or
   b) the device has a second light source for emitting a second illuminating light, the liquid region being illuminated with the second illuminating light and the second measurement signal subsequently emanating from the liquid region.

8. The device according to claim 1, wherein:
   a) the first imaging device generates a bright-field image based on the first measurement signal and the second imaging device generates a fluorescence image based on the second measurement signal; and/or
   b) the first imaging device generates a fluorescence image for imaging a particle marked with a fluorescent dye based on the first measurement signal, and the second imaging device generates another fluorescence image generated for imaging of a particle which is marked with another fluorescent dye based on the second measurement signal.

9. The device according to claim 1, wherein when determining whether the particle condition is satisfied, the evaluation device checks whether the particle determined by means of the first measurement signal and the particle determined by means of the second measurement signal are the same particle.

10. The device according to claim 1, wherein the evaluation device determines that the particle condition is satisfied when a determined number of particles arranged in the liquid region corresponds to a predetermined number of particles.

11. The device according to claim 1, wherein the evaluation device determines that the particle condition is satisfied when:
    a) a number of particles determined by means of the first measurement signal corresponds to a predetermined number of particles and no particles that can be determined by means of the second measurement signal are arranged in the liquid region, or when
    b) no first particles that can be determined by means of the first measurement signal are arranged in the liquid region and a number of particles determined by means of the second measurement signal corresponds to a predetermined number of particles.

12. The device according to claim 1, wherein the evaluation device determines that the particle condition is satisfied when a number of particles determined by means of the first measurement signal and a number of particles determined by means of the second measurement signal correspond to a predetermined number of particles, and when it is determined that the at least one particle determined by means of the first measurement signal and the at least one particle determined by means of the second measurement signal are the same particle.

13. The device according to claim 1, wherein the device further comprises a dispenser for dispensing a liquid sample.

14. The device according to claim 13, wherein the device further comprises a control device which controls a dispensing process depending on whether the particle condition is satisfied.

15. The device according to claim 14, characterized in that the control device determines a deposit location for the liquid sample to be dispensed, wherein the deposit location depends on whether the particle condition is satisfied.

16. The device according to claim 14, wherein the device further comprises a moving device that moves the dispenser and/or a carrier for receiving the dispensed liquid sample, wherein the control device controls the moving device and/or the carrier.

17. The device according to claim 13, further comprising a deflection device that deflects a liquid sample dispensed from the dispenser and/or a catching device that catches a liquid sample dispensed from the dispenser.

18. A device for examining a liquid sample including a liquid and at least one particle, the device comprising:
   a detection device that detects a first measurement signal emanating from a liquid region of the liquid sample, by means of which at least one particle having a first property can be determined, and that detects a second measurement signal emanating from the liquid region, by means of which at least one particle having a second property can be determined; and
   an evaluation device which evaluates the first measurement signal and the second measurement signal independently of one another and determines whether a particle condition is satisfied in the liquid region based on the evaluated first measurement signal and the evaluated second measurement signal, wherein when determining whether the particle condition is satisfied, the evaluation device checks whether the particle determined by means of the first measurement signal and the particle determined by means of the second measurement signal are the same particle, wherein the evaluation device determines that the particles determined by means of the first and second measurement signals are the same particle when the location of the particle determined by means of the first measurement signal corresponds to the location of the particle determined by means of the second measurement signal.

19. A device for examining a liquid sample including a liquid and at least one particle, the device comprising:
   a detection device that detects a first measurement signal emanating from a liquid region of the liquid sample, by means of which at least one particle having a first property can be determined, and that detects a second measurement signal emanating from the liquid region, by means of which at least one particle having a second property can be determined; and
   an evaluation device which evaluates the first measurement signal and the second measurement signal independently of one another and determines whether a particle condition is satisfied in the liquid region based on the evaluated first measurement signal and the evaluated second measurement signal, wherein when determining whether the particle condition is satisfied, the evaluation device checks whether the particle determined by means of the first measurement signal and the particle determined by means of the second measurement signal are the same particle, wherein the evaluation device determines that the particles determined by means of the first and second measurement signals are the same particle based on a distance between the particle determined by means of the first measurement signal and the particle determined by means of the second measurement signal being smaller or larger than a limit value.

20. A non-transitory computer readable medium comprising programmed instructions that, when executed on a processor, cause the processor to:
   receive a first measurement signal, which emanates from a liquid region and serves to determine at least one particle with a first property;
   receive a second measurement signal, which emanates from the liquid region and serves to determine at least one particle having a second property;
   evaluate the first measurement signal and the second measurement signal independently of one another;
   determine whether a particle condition has been satisfied in the liquid region based on the evaluated first measurement signal and the evaluated second measurement signal;
   determine a deposit location for a drop of the liquid sample to be dispensed, wherein the deposit location depends on whether the particle condition is satisfied; and
   control an actuating means of a dispenser for dispensing the liquid sample to eject the drop of the liquid sample from the dispenser into the deposit location.

* * * * *